(12) United States Patent
Theegala (10) Patent No.: US 7,942,943 B2
(45) Date of Patent: May 17, 2011

(54) BIOMASS GASIFIER SYSTEM WITH LOW ENERGY AND MAINTENANCE REQUIREMENTS

(75) Inventor: Chandra S. Theegala, Baton Rouge, LA (US)

(73) Assignee: Board of Supervisors of Louisiana State University and Agricultural and Mechanical College, Baton Rouge, LA (US)

(*) Notice: Subject to any disclaimer, the term of this patent is extended or adjusted under 35 U.S.C. 154(b) by 337 days.

(21) Appl. No.: 12/139,940

(22) Filed: Jun. 16, 2008

(65) Prior Publication Data

US 2009/0064578 A1    Mar. 12, 2009

Related U.S. Application Data

(60) Provisional application No. 60/944,215, filed on Jun. 15, 2007.

(51) Int. Cl.
*C10J 3/68* (2006.01)

(52) U.S. Cl. ............. 48/76; 48/61; 48/127.9; 48/127.3; 48/197 R; 48/128; 48/198.7; 48/127.1; 48/215; 48/214; 48/214 R; 48/203; 122/5; 585/240; 585/242; 423/210; 423/215.5; 202/261; 202/100

(58) Field of Classification Search ........... 48/61, 127.3, 48/127.9, 128, 215, 214 R, 76; 122/5; 585/240, 585/242; 423/210, 215.5; 202/100
See application file for complete search history.

(56) References Cited

U.S. PATENT DOCUMENTS

| 4,334,484 | A | 6/1982 | Payne et al. | 110/210 |
| 4,483,256 | A | 11/1984 | Brashear | 110/210 |
| 4,531,462 | A | 7/1985 | Payne | 110/210 |
| 4,586,442 | A | 5/1986 | Caughey | 48/76 |
| 4,822,935 | A | 4/1989 | Scott | 585/240 |
| 4,929,254 | A | 5/1990 | Kooinan et al. | 48/76 |
| 5,028,241 | A | 7/1991 | Kooinan et al. | 48/87 |
| 5,279,234 | A | 1/1994 | Bender et al. | 110/210 |
| 5,666,890 | A | 9/1997 | Craig | 110/229 |
| 6,830,597 | B1 | 12/2004 | Green | 48/209 |
| 2003/0115800 | A1 | 6/2003 | Yamada et al. | 48/197 |
| 2004/0244289 | A1* | 12/2004 | Morozumi et al. | 48/77 |
| 2005/0172558 | A1* | 8/2005 | Van Stijn | 48/210 |
| 2007/0094929 | A1 | 5/2007 | Kang et al. | 48/111 |

* cited by examiner

*Primary Examiner* — Kaity V. Handal
(74) *Attorney, Agent, or Firm* — Bonnie J. Davis; John H. Runnels (57) ABSTRACT

A down-draft fixed bed gasifier is disclosed that produced clean producer or synthesis gas. The gasifier can be installed at a stationary location or can be scaled down to enable placing the gasifier on a trailer that can be moved to the site of biomass generation. The gasifier is vertically oriented and generally cylindrical, and the design allows for a continual input of feedstock into the gasifier with less clogging and without lowering the gas pressure inside the gasifier. The design incorporates an internal catalyst to clean tars from the produced gas, and uses heat from the combustion chamber of the gasifier to heat the catalyst. The flow of air may be either positive flow or negative flow.

15 Claims, 5 Drawing Sheets

Fig. 5

BIOMASS GASIFIER SYSTEM WITH LOW ENERGY AND MAINTENANCE REQUIREMENTS

The benefit of the filing date of U.S. provisional application Ser. No. 60/944,215, filed Jun. 15, 2007, is claimed under 35 U.S.C. §119(e).

This invention pertains to a down-draft fixed-bed, gasifier that produces clean producer (or synthesis) gas, requires low energy and low maintenance and can be run in either a positive air pressure or negative air pressure mode. The design can be installed at a stationary location or can be scaled down to enable placing the gasifier on a trailer that can be moved to the site of biomass generation.

Gasification is a thermochemical process in which organic matter (or biomass) is made to react with limited quantities of air or oxygen at high temperatures to generate producer gas (or synthesis gas) that comprises CO, $H_2$, $CH_4$, and other non-combustible gases. Various forms of biomass can be used as feedstock for gasification including, without limitation, the following: wood chips or other arbor material (e.g., pine straw), crop residues (e.g., cotton waste, corn waste, peanut hulls, or bagasse), dedicated energy crops (e.g., kenaf, pulp from low sugar energy cane, and switch grass), dried animal wastes, processed sewage sludge, hospital wastes, processed manure, coal and other organic matter.

Although gasification technology has been known for some time, delivering high quality gas to downstream processes such as internal combustible engines, turbines, and catalytic synthesis processes (such as Fischer Tropsch) remains a challenge. The produced gas (or "synthesis gas") usually contains particulates and organic contaminants (tars) which, if not removed, can cause severe operational problems. For example, satisfactory internal combustible engine operation has an acceptable particulate content of about <50 mg/$Nm^3$ and a tar content of about <100 mg/$Nm^3$.

Gasifiers can be broadly classified as down-draft, up-draft, or fluidized bed units. The fluidized bed system allows easy scale-up, but is hampered by high particulate and tar concentrations in the exiting gases. The downdraft gasifiers are the "cleanest" in terms of tar production (~1 g-tar/$Nm^3$). However, from a scale-up perspective, downdraft gasifiers have some sizing limitations.

Most of the commercial gasifiers that are marketed in the United States are large and expensive. Compared to coal, the biomass feedstock that can be used for gasification is relatively less energy-dense. The transportation costs associated with hauling low-density biomass can be very expensive. However, a small or portable biomass gasifier that could be placed or brought to the site of biomass generation would offer an economical solution.

U.S. Pat. Nos. 4,334,484 and 4,531,462 disclose a gasifier with two sequential combustion chambers and with a venturi gas pump to draw the gas into the second combustion chamber from the first combustion chamber.

U.S. Pat. No. 4,483,256 discloses a biomass gasifier and several components comprising a mostly horizontal flow system, with the gas flow due to a venturi eductor system that draws the gases from the combustion chamber.

U.S. Pat. No. 4,586,442 discloses a gasifier with an inclined grate made of hollow metal tubes to move the biomass from the feeder down into the combustion area of the gasifier.

U.S. Pat. No. 4,822,935 discloses a hydrogasification reactor for producing high yields of methane by mixing biomass particles and catalyst particles in the reactor, where the catalyst has both hydrogenation and tar cracking properties.

U.S. Pat. Nos. 4,929,254 and 5,028,241 disclose a downdraft fixed bed gasifier system, constructed of modular units, with the gasifier reaction chamber constructed to maintain horizontal temperature control.

U.S. Pat. No. 5,279,234 discloses a gasifier that is part of a heating system using negative pressure and a horizontal component arrangement that incorporates anaerobic pyrolysis, incandescent charcoal gasification, cracking and total gas combustion.

U.S. Pat. No. 5,666,890 discloses a fluidized bed gasifier with a high pressure feed tank and a conveyor from the feed tank to the fluidized bed reactor.

U.S. Pat. No. 6,830,597 discloses a method to heat and liquefy the biomass by feeding the biomass into a reactor tube that is inside, and in direct thermal contact with the combustion chamber, creating two chambers for biomass combustion.

U.S. Patent Application Publication No. 2003/0115800 discloses a fluidized bed reactor with a catalyst inside the reactor where combustion of the biomass occurs at the surface of the catalyst at temperatures less than 800° C.

U.S. Patent Application Publication No. 2007/0094929 discloses a low temperature gasifier for refined biomass that uses a circulating catalytic fluidized-bed heating furnace and a catalyst reformer as a separate component in series with the heating furnace.

I have discovered a new down-draft, fixed bed gasifier that is vertically oriented and generally cylindrical. The new gasifier is configured to produce clean gas, to lower the energy requirement to produce clean gas, and to lower the maintenance time. The design allows for a continual input of feedstock into the gasifier with less clogging and without lowering the gas pressure inside the gasifier. The design incorporates a catalyst to clean tars from the produced gas, where the catalyst is heated by thermal contact with the combustion chamber of the gasifier, thus increasing the efficiency and lifetime of the catalyst without requiring an external heating source. The design also incorporates features to bypass the catalyst with the produced gas until the catalyst reaches a minimum temperature. This feature will lower the catalyst fouling during initial startup. In addition, the design allows the flow of air through the combustion chamber to be either a positive flow or a negative flow, depending on the form of biomass and the amount of oxygen added for combustion. The generated gas can be further purified by flowing through additional components, for example, through a cyclone separator, a gas cooling unit, a gas drying unit, a baghouse filter, and a gas scrubbing unit. The synthesis gas can be used for heating applications or can be coupled with an electricity generator (gas model). This design can be installed at a stationary location or can be sized small enough to be trailer-based. A small gasifier would burn about 50 lb biomass per hour to produce from about 10 to about 18 KWe, a medium gasifier would burn about 500 lb biomass per hour to produce from about 100 to about 180 KWe, and a large gasifier would burn about 2000 lb biomass per hour to produce from about 400 to about 720 KWe. If using the portable version, the gasifier can be brought to the place of biomass generation to lower the cost of transporting the biomass. The same design can be employed for a stationary gasifier, which can be centrally located adjacent to a major biomass source. Several small gasifiers could be made to work in parallel to process larger quantities of biomass. The components of the gasifier can be configured to be manually controlled by an operator or automated to be remotely controlled by a computer.

The new gasifier will have several advanced particulate cleaning and tar cracking components that will allow troublefree operation of downstream internal combustible engines or power generation turbines. The automated material transportation system and airlock feeding mechanism will aid the low maintenance operation of the system. This unit can be used to produce power from any combustible biomass source, including tree residues, crop residues, dedicated energy crops, dried animal wastes, and other organic matter (such as hospital wastes).

EXAMPLE 1

General Description of Gasifier

Figure 1A:
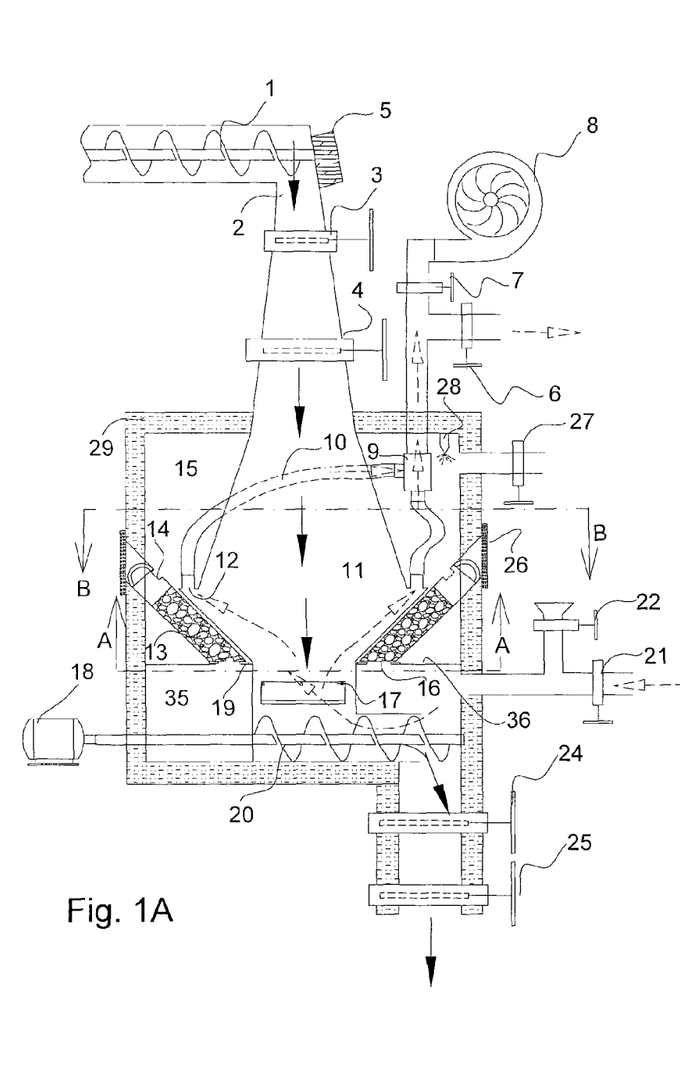
FIG. 1A is a schematic drawing illustrating one embodiment of the gasifier using the airlock feeding mechanism and showing the air flow during the Run Mode, using negative pressure to flow air into the combustion chamber of the gasifier.
Figure 2:
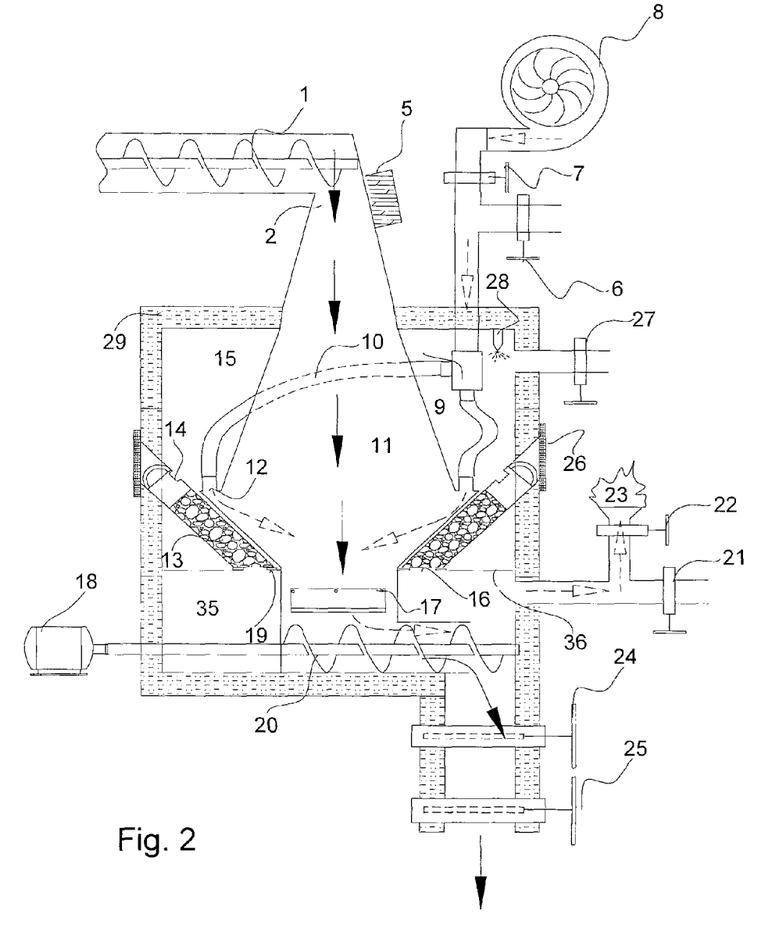
FIG. 2 is a schematic drawing illustrating a second embodiment of the gasifier without an airlock feeding mechanism and showing the air flow during the Pre-fire Mode of the gasifier.
Figure 3:
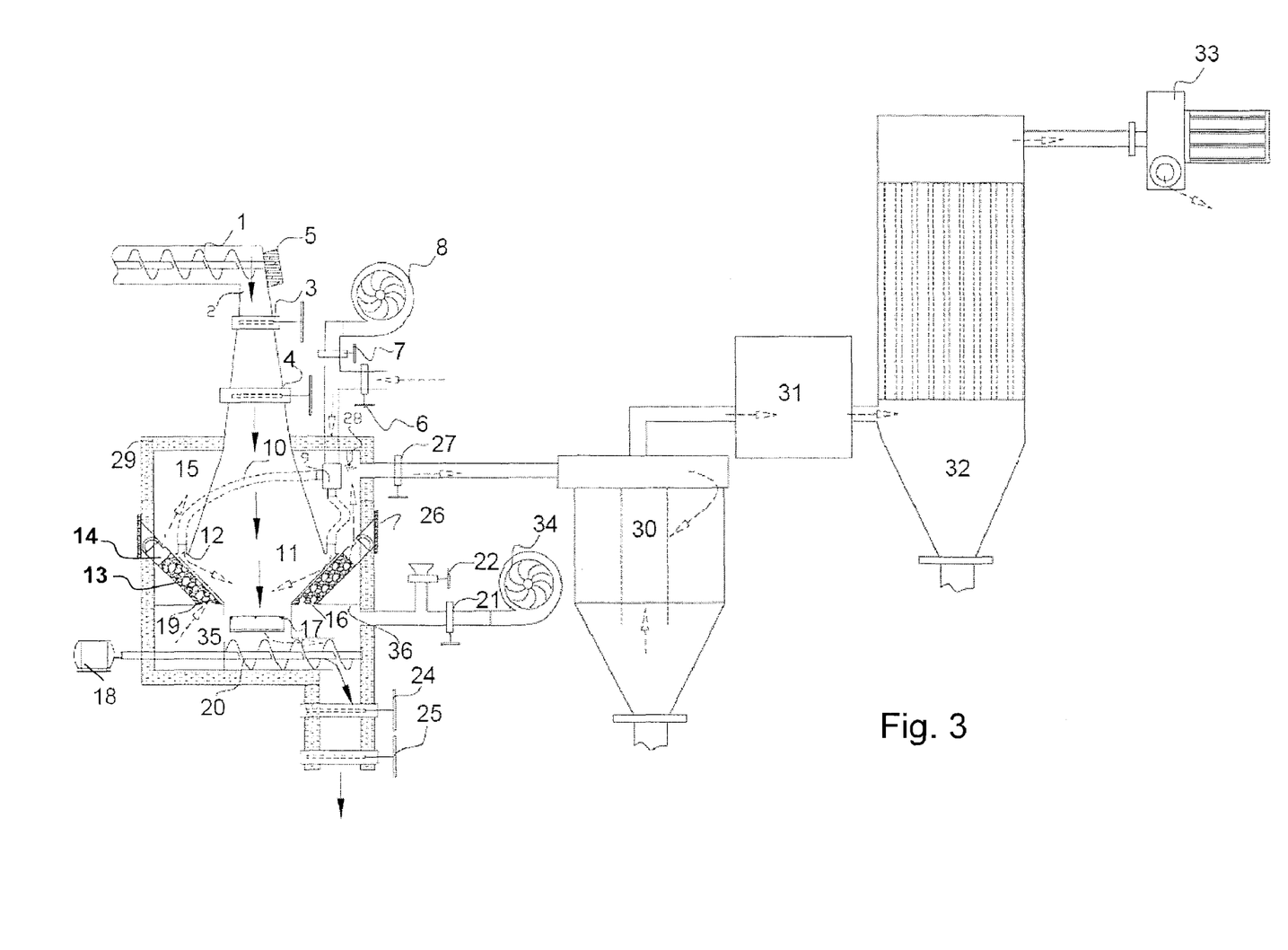
FIG. 3 is a schematic drawing illustrating the gasifier linked in series to additional components to purify the resulting gas and showing the air flow during the Initiation Mode of the gasifier.
Figure 4:
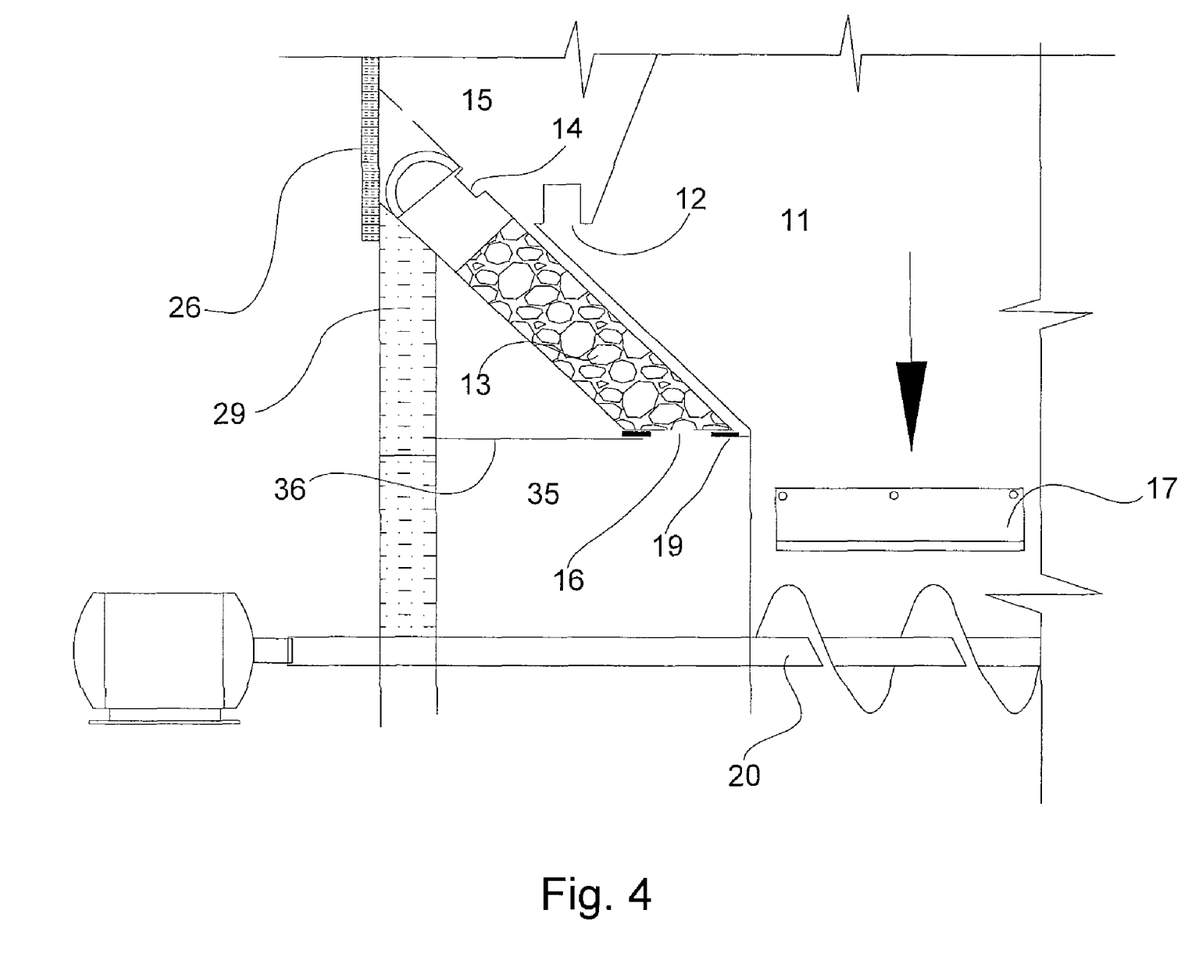
FIG. 4 is a schematic drawing illustrating the placement of the catalyst cartridge (13) in relation to the wall of the combustion chamber (11) and the outer wall (29) of the housing.

Shown in FIGS. 1A, 2 and 3 is a gasifier that is a downdraft, fixed bed design. The gasifier is oriented vertically and is generally cylindrical. As shown in the figures, the outer housing is stripped away from the front, and only the double-sided wall (29) of the generally cylindrical housing is shown. The wall (29) is packed with insulation which minimizes heat loss from the combustion chamber (11). The outer housing has two chambers (top chamber (15) and lower chamber (35)) separated by a metal plate (36) attached to the lower tubular section of the combustion chamber (11). The main combustion chamber is contained inside the housing, but the feed auger (1), top part of the main chamber (2), and the knife gate or sliding gate valves (3) and (4) are located outside the housing. (See FIGS. 1 and 3). The wall of the main combustion chamber (11) of the gasifier continuously flares out from the top near the feed auger (1) to the air intake ports (12) which are located on lip attached to the flared chamber wall. From the lip, the wall slants toward the center to a circular bottom cylinder. This bottom cylinder of the combustion chamber opens into an L-shaped chamber where an ash auger (20) is located for removal of ash material. The ash material moves out of the L-shaped chamber and is pushed towards the end of the ash auger (20), and eventually exits the gasifier housing through sliding gate valves (24) and (25). The bottom tubular section of the combustion chamber contains a firedoor (17) which allows access into the main chamber (11) of the gasifier. This firedoor (17) is accessed from the outside through a corresponding door in the housing (not shown) This firedoor is used for starting the initial fire and can be used for visually inspecting the inside of the combustion chamber. The main gasifier combustion chamber (11) can be lined with fireclay or other high temperature tolerant material. The chamber (11) can also contain sensors to monitor feedstock levels and temperature (multiple thermocouples), which are not shown on the figures. In addition, the figures do not show various components that would allow the gasifier operation to be fully automated.

Air enters the combustion chamber during operation of the gasifier from the air intakes (12), after coming through the hoses (10) from manifold (9). Air or oxygen entering the combustion chamber can come from blower (8) if valve (7) is open (positive pressure air flow mode), or can come from the outside if valve (6) is open (negative pressure air flow mode). Gas exiting the combustion chamber during operation flows out the lower part of the combustion chamber (11), through the fire, embers, and ash, along the ash auger (20) and into the bottom housing chamber (35). From the bottom housing chamber (35), the gas flows through openings (16) in the metal plate (36) and across catalyst-filled cartridges (13) to openings (14) in the cartridges. The gas then flows into top housing chamber (15) and exits though valve (27) to additional purifying components. The air flow is controlled by regulating the valves near the blower that is being used.

Feedstock enters the gasifier at the top (2) of the combustion chamber. The flared shape of this upper part of the combustion chamber (11) and the use of sliding gate valves allows the feedstock to freely fall to the lower combustion chamber where the hottest temperatures will exist. Optionally, a feed vibrator (5) (pneumatic or electric) can be added to minimize the sticking of feedstock at the top of the chamber. Ash exits the combustion chamber (11) along the ash auger (20) into the lower housing chamber (35) and out sliding gate valves (24) and (25).

The gasifier combustion chamber can be constructed with any material that can withstand high temperatures and corrosive conditions. While the outer wall can be a high temperature steel alloy, the inner combustion chamber wall should be lined with a hot-face lining or with refractory materials such as fusion-cast magnesium-aluminum spinel (e.g. $MgAl_2O_4$), Fusion-cast 80% chromia-MgO, and other advanced high refractory materials. The lower temperature components of the gasifier can be constructed with high-chromium stainless steel material (such as grades 2111 HTR, 309, 310) or with high temperature steel alloys. The wall thickness of the combustion chamber and other components will depend on the size of the gasifier and structural stability requirements.

Feed Section Description

Figure 1B:
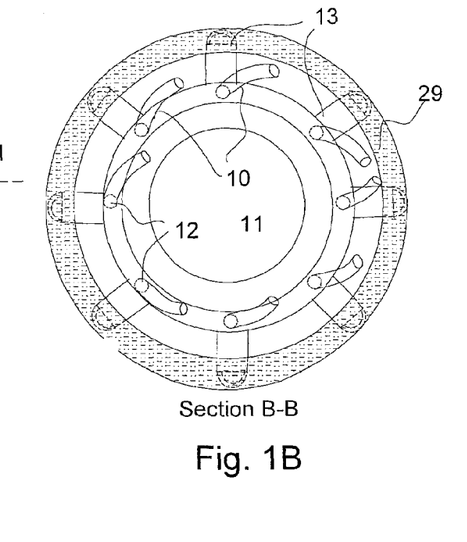
FIG. 1B is a schematic drawing illustrating a view looking down into the gasifier from the cross-section defined as B-B on FIG. 1A.

A feed auger (1) supplies the feedstock to the gasifier. The feedstock can be any chipped or pelletized organic matter, including: wood chips, saw dust pellets, wood pellets, dried animal manure, crop residues, hospital wastes, used tires, etc. The size of the feedstock should be no greater than from about 0.5 to 3 inches, so that the particles will completely combust at the temperatures in the gasifier. The actual size is dependent on the form of biomass and the size of the gasifier. The feedstock may require drying prior to feeding to the gasifier. The feed auger (1) is intermittently operated, can be regulated by a variable speed motor to supply a sufficient amount of feedstock to the gasifier, and can easily be automated. Depending on the feeding mechanism employed, two different airlock configurations are possible. The first embodiment, as shown in FIG. 1, is employed when the feed auger (1) itself does not have an air lock to prevent loss of pressure from the gasifier while feeding the feedstock. This mechanism employs two knife gate or sliding gate valves (3 and 4) as an air lock, which permits feeding of the feedstock to the gasifier without any loss of pressure inside the gasifier. These types of valves permit the feedstock to freely flow without clogging. Sliding gate valves (3) and (4) can be either pneumatically or electrically operated. The operation of the two sliding gate valves is synchronized with the operation of the feed auger (1). In a second embodiment as shown in FIG. 2, the gasifier lacks the sliding gate valves which would not be necessary if the feed auger (1) has an airlock built into it, or if the gasifier is operated only in a negative pressure air flow mode and if the majority of the air is drawn from inlet ports (12) even when an air lock mechanism is not present.

Initiation Mode

To start the operation of the gasifier, the main combustion chamber (11) is filled with feedstock using feed auger (1). Thereafter, feedstock is added as needed. A startup fire in the gasifier is initiated by opening the outer access door in the housing (not shown in the figures) and the firedoor (17) on the lower part of combustion chamber (11). The fire can be initiated using the feedstock in the chamber, or by placing some initial fire-starting material in the bottom of combustion chamber (11). The initial fire-starting material could be any material with better combustion properties than the feedstock (e.g., easily combustible wood chips, pine straw, coal or charcoal) or feedstock material soaked in a commercially available lighter fluid. This initial material is ignited, for example, with a propane torch. Another alternative is to use electrically operated hot surface igniters. After ignition, firedoor (17) and the outer housing door are closed. The gasifier design allows the air flow during the Initiation Mode to be up from the bottom of combustion chamber (11), which allows the fire-starting material to burn up towards the feedstock. The air flow during this Initiation Mode is shown by arrows and dotted lines in FIG. 1. This upward air flow is created by pressurized air from blower (34) (shown in FIG. 3) blowing atmospheric air (or oxygen-rich air) into the gasifier through valve (21). Fresh air will enter the bottom combustion chamber (11) from around ash auger (20), and the fumes will exit through one or more air intake ports (12). Eight air intake ports (12) are shown in FIG. 1A and in the sectional view in FIG. 1B. As shown, these air intake ports (12) open into combustion chamber (11) and are spaced around the outside of this chamber. The fumes exiting through the intake ports (12) flow through hoses (10), made from a fire resistant material, e.g., a corrugated, flexible stainless steel tube, and enter a common distribution manifold (9). The fumes finally exit the gasifier through valve (6) into the atmosphere. During the Initiation Mode, only valves (21) and (6) are open; all other valves remain closed. Oxygen or oxygen-rich air could be supplied to the gasifier during this initiation process to create more suitable conditions for the initial burning of the type of biomass used as feedstock. At this point, gas is neither captured nor gasification. The time needed for this Initiation Mode is based on readings from various thermocouples located inside combustion chamber (11). Once the feedstock in combustion chamber (11) of the gasifier is ignited and the combustion chamber temperature reaches from about 400° C. to about 800° C., the operation is switched to the Pre-fire Mode.

Pre-Fire Mode

Figure 1C:
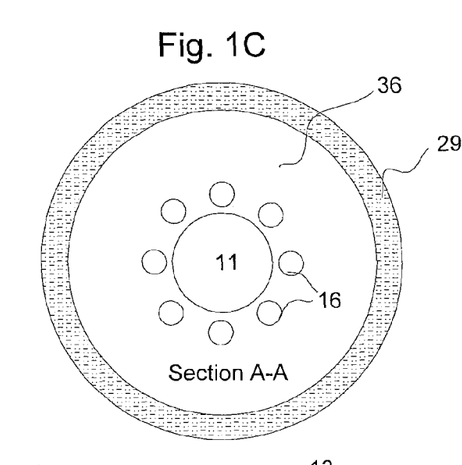
FIG. 1C is a schematic drawing illustrating a view looking up into the gasifier from the cross-section defined as A-A on FIG. 1A.

The Pre-fire Mode is a step primarily to protect the tar cracking catalyst. Tar cracking catalysts work optimally at high temperatures. If gas with high amounts of tar passes a cool catalyst, the catalyst is fouled and its working lifetime is shortened. In this design, the tar cracking catalyst is contained in one or more catalyst cartridges (13) that are located outside the main combustion chamber of the gasifier, adjacent to the lower, sloping wall of combustion chamber (11), as shown in FIG. 1A. The catalyst cartridges (13) have an opening at one end and the cartridges (13) are secured tightly (against gaskets (19)) around openings (16) to prevent any gas leaking at this connection. Each catalyst cartridge (13) has an inlet opening at the bottom and an outlet opening (14) near the top to allow gas to escape into the top chamber (15) of the housing. In one embodiment, each catalyst cartridge (13) is accessible from the outside by a small door (26) in the housing wall (29). The catalyst cartridge (13) can be pulled out this door (26) and easily replaced. Blank cartridges with a plugged inlet opening can be used if a lesser degree of tar cracking is necessary. Or cartridges can be completely removed if no tar-cracking is needed. The catalyst cartridges are located between the outer wall of the housing, and bottom metal plate (36) that separates the top chamber of the housing (15) from the bottom chamber of the housing (35). As shown, catalyst cartridge (13) is placed at an angle along the wall of combustion chamber (11). By locating each catalyst cartridge (13) adjacent to the main combustion chamber (11), the catalyst is heated by thermal contact with the chamber wall as combustion occurs inside. The metal plate (36) separating the top housing chamber (15) from the bottom housing chamber (35) is shown in FIG. 1C and FIG. 1A. This plate is welded to the bottom combustion chamber (11), and contains one or more holes (16) to allow gas to flow up from the bottom housing chamber (35) into the top housing chamber (15) by flowing across the catalyst in cartridges (13) and out through outlet 14.

In the Pre-Fire mode, blower (34) is turned off and valve (6) is closed. Blower (8) is turned on, and valves (7) and (22) are opened. This can all be automated. Atmospheric air (and/or oxygen) from blower (8) enters combustion chamber (11) through manifold (9), air tubing (10), and air inlet ports (12). The air flow in this Pre-fire Mode is shown by dotted arrows in FIG. 2. At the beginning of the Pre-Fire Mode, the catalyst temperature is not yet at optimum temperature (a range of 400° C. to 800° C.). The gas generated during this stage has a high concentration of tars. Flowing gas with a high concentration of tars though a cold catalyst bed can foul the catalyst. To avoid this problem, in the Pre-fire Mode, the gas exits from valve (22) and is flared (23) to minimize smoke and air pollution. At this time, all valves except valves (7) and (22) are closed. The gasifier is operated in the Pre-fire Mode until the thermocouples indicate the required minimum temperature of the catalyst has been achieved. This required temperature depends on the type of catalyst; for example, for dolomite the minimum temperature is about 700° C. to about 950° C. After the gasifier has operated in the Pre-fire Mode for about 15 to 30 min, ash auger (20) is started to remove the accumulating ash.

Run Mode

Once the catalyst reaches its minimum operating temperature, blower (8) is turned off, and valves (7) and (22) are shut. This automatically turns flare (23) off. Blower (33) (shown in FIG. 3) may be used to pull air from the system, when the gasifier is operated using negative (sucking) air pressure. Blower (33) is turned on and valve (6) and valve (27) are opened simultaneously. The gasifier can also be operated using a positive (blowing) air pressure using blower (8) by keeping valve (7) open, keeping valve (6) closed, closing valve (22), and opening valve (27). In FIGS. 1A and 3, the feedstock material flow is shown by the solid arrows, while the gas flow for the Run Mode for negative pressure is represented by dotted arrows. The feedstock mechanism includes an auger (1) and a vibrator (5). In one embodiment, sliding gate valves (3) and (4) are used to maintain gas pressure in the combustion chamber (11). However, these valves may be kept open if a particular feedstock or its form sufficiently retards gas flow when the feedstock is added to the combustion chamber. Keeping these valves open will effectively convert the first feed mechanism (as seen in FIG. 1) to the second (as seen in FIG. 2)

Based on the stoichiometric oxygen requirements for gasification, air flow rate (for the negative pressure mode) is adjusted using blower (33) or valve (6) to enter the inlet ports (12). To minimize the negative pressure in the gasifier, an extra valve can be added between the blower (33) and the gasifier, for example, after the bag-house filter (32). The air (or oxygen or a combination) is introduced into the combustion chamber (11). The combustion of feedstock in the presence of oxygen creates "producer gas" (or richer synthesis gas if a high concentration of oxygen is used), primarily comprising the combustible gases $H_2$, CO, and $CH_4$, along with the non-combustible gases, $N_2$ and $CO_2$. The use of air produces a lower BTU producer gas than will use of oxygen. The producer gas (or synthesis gas) passes out of the combustion chamber (11) at the bottom, passing through a bed of hot fire and ash, eventually exiting through the ash auger (20) opening into the bottom housing chamber (35). By requiring the produced gas to flow across the ash and hot fire, greater amounts of tar are removed from the gas. The only exit for the gas from the bottom housing chamber (35) in Run Mode is through the catalyst bed inside cartridges (13). The catalyst inlet port (16) has a high temperature gasket (19), which prevents leakage of the gas where the catalyst cartridge (13) joins the metal plate (36). Multiple catalyst cartridges (13) are employed to increase the catalyst volume and increase the contact time between the gas and the hot catalyst. The catalyst is preferably in a pelletized form to allow easy gas flow. Although pelletized dolomite can be used as a catalyst, synthetic catalysts that have lower minimum process temperatures are preferred, for example, see U.S. Patent Application Publication No. 2003/0115800 which discloses a catalyst of $Rh/CeO_2/M$, where M is equal to $SiO_2$, $Al_2O_3$, or $ZrO_2$. Gas exiting the catalyst bed will exit though vent holes (14), which are located in the upper portion of catalyst cartridge (13). Producer gas (or synthesis gas) exiting the catalyst beds will enter the upper housing chamber (15). The $H_2$:CO ratio may be adjusted if necessary by a controlled addition of steam into the upper chamber. Steam may be generated by using a copper tube connected to a clean water source and passing the tube around a hot section of the gasifier in the upper chamber (15) of the housing. One or more steam nozzles (28) can be placed to inject steam at an appropriate stoichiometric flow rate (only one nozzle is shown in FIG. 1A). Blower (33) sucks the gas in the upper chamber (15) out of the housing through a pipe controlled by valve (27). A variable speed drive gearhead motor (18) or pneumatic drive will move the burnt material at the bottom of the gasifier using ash auger (20). The rate of ash removal can be adjusted to match the burn rate of the gasifier. Two pneumatically (or electrically) operated sliding gate valves (24) and (25) are opened and closed in sequence to remove the ash from the housing without pressure drops within the gasifier.

Further Purification of the Producer (or Synthesis Gas)

Producer gas (or synthesis gas) exiting valve (27) enters a series of gas purification components such as a cyclone separator (30) to get rid of particulates greater than about 10 µm, a gas cooling unit (31) to lower the temperature (e.g., less than about 200° C.), and a baghouse filter (32) to remove finer particulates before entering the run-mode blower (33) as shown in FIG. 3. The gas cooling unit (31) can be an air or water heat exchanger, and the resulting heated air or water could be used to heat or provide hot water to a building. Baghouse filter (32) is preferably a pulsed-jet baghouse filter that can periodically clean itself by air flow reversal. Additional components to treat the produced gas can be added including, for example, a drying device or a gas scrubbing device that would remove certain unwanted gases from the produced gas. The producer gas or synthesis gas that exits blower (33) can be collected and stored for use in a variety of applications, including without limitation, power generation, heat generation, and Fischer Tropsch or other gas-to-liquid conversions.

For the Run Mode using air or low amounts of oxygen, the preferred air flow is use of negative pressure to pull gas into combustion chamber (11). If negative pressure is used, the feed auger (1) may not need an air lock system, and sliding gate valves (4) and (5) can remain open. However, if a high concentration of oxygen is used, then the preferred air flow would be a positive pressure to push the oxygen into combustion chamber (11). In the positive pressure mode, any cracks in the gasket or any other leaks will not draw in any oxygen after the gasification stage. Thus any leaks in the gasifier system will only push out hot gases and no outside oxygen would be added to the high temperature, combustible gases. This increases the safety of operation.

Operation and Maintenance

The above process and its various components can be either manually controlled, or automated for remote control for continuous operation. The addition of various sensors will allow the process to be controlled by a computer. The unique pre-fire mode of this gasifier minimizes the fouling of the catalyst during initiation of the gasifier when the temperatures are still climbing. Although the catalyst should last several weeks or months, it will need to be periodically checked and replaced if necessary. In one embodiment, catalyst doors (26) are incorporated for quick removal of the charged catalyst cartridge (13). The spent catalyst can be regenerated to use again by heating to a temperature greater than about 1000° C., depending on the catalyst. The augers, gear head motors, blowers, and pneumatic (or electric) valves should also be checked periodically and replaced or repaired if necessary.

EXAMPLE 2

Prototype of Gasifier

Figure 5:
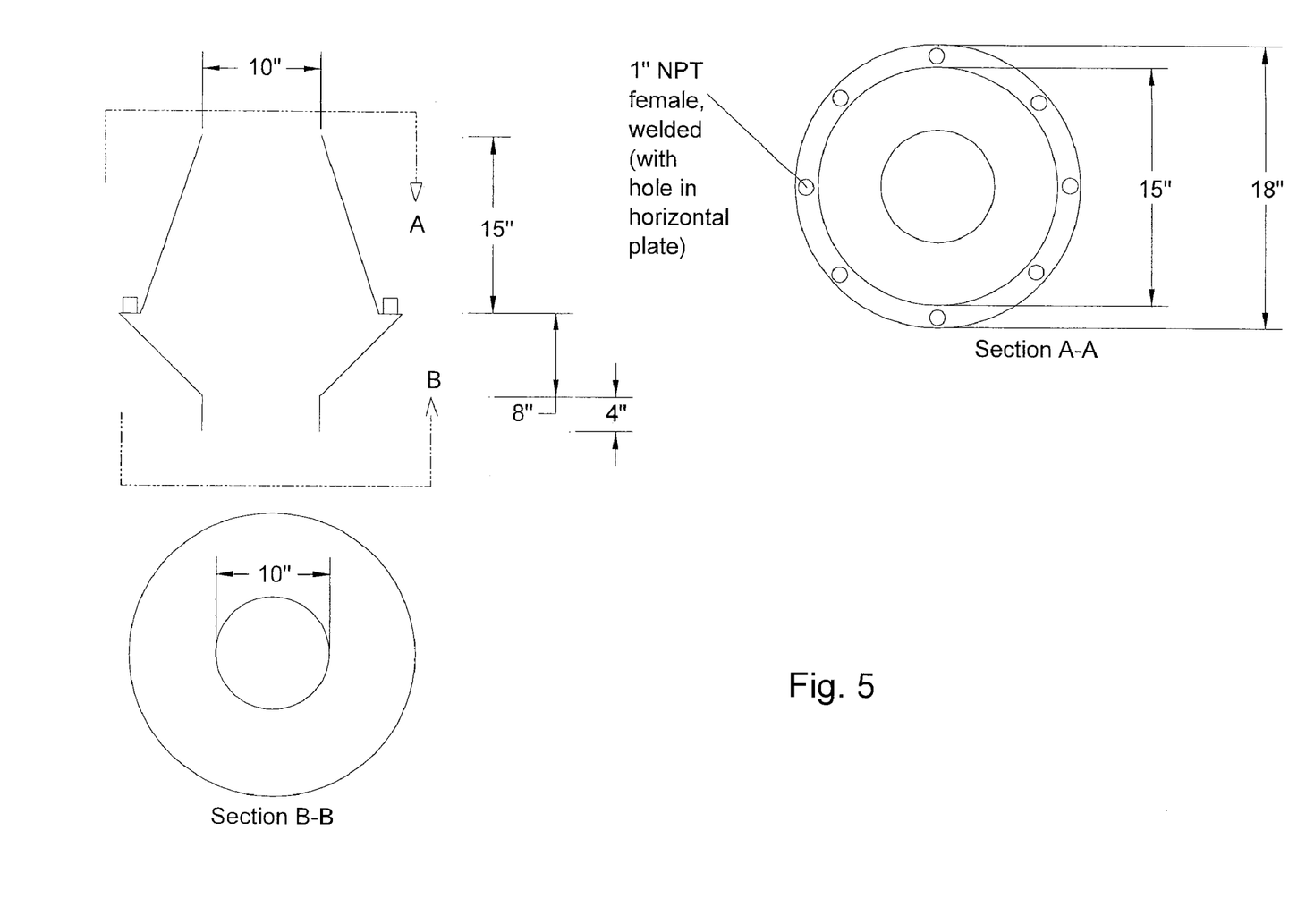
FIG. 5 is a drawing of the prototype of the combustion chamber of the gasifier as constructed from high temperature steel alloy.

A prototype of the combustion chamber of the gasifier was constructed from high temperature steel alloy. The inner wall lining is not shown on this diagram. The dimensions of this prototype are shown in FIG. 5. This gasifier is expected to burn from about 20 to about 40 lbs biomass per hour. The combustion chamber can be scaled up to accommodate a larger amount of biomass.

The complete disclosures of all cited references are hereby incorporated by reference. In the event of an otherwise irreconcilable conflict, however, the present specification shall control.

What is claimed:

1. A gasifier to produce combustible gas from a biomass feedstock, said device comprising:
    (a) a housing;
    (b) a combustion chamber having a top portion and a bottom portion, and a flared mid-section, wherein said combustion chamber is located substantially inside said housing;

(c) a feeder adapted to transfer biomass feedstock into said top portion of said combustion chamber at a controlled rate;

(d) a metal plate between said housing and said combustion chamber, below said flared mid-section, wherein said metal plate separates portion of said housing outside of said combustion chamber into an upper housing chamber and a lower housing chamber;

(e) one or more catalyst cartridges located inside said housing and adjacent to said flared-mid-section of said combustion chamber wherein each of said one or more cartridges: (i) has an inlet opening into said lower housing chamber and an outlet opening into said upper housing chamber, (ii) connects said upper housing chamber to said lower housing chamber and (iii) is in thermal contact with said combustion chamber, so that heat generated from combustion within said combustion chamber will heat said one or more catalyst cartridges;

(f) one or more air intakes adapted to selectably supply air flow into said combustion chamber in either an upward or a downward direction; wherein at least one air intake is adapted to cause gas from said combustion chamber to traverse the bottom of said combustion chamber, to enter said lower housing chamber, to cross said one or more catalyst cartridges by entering said inlet opening and exiting said outlet opening into said upper housing chamber, and then exit said housing; and (g) one or more air pumps adapted to selectably produce either negative air pressure or positive air pressure in said combustion chamber.

2. The gasifier as in claim 1, wherein said feeder comprises a variable speed auger and an air lock.

3. The gasifier as in claim 2, wherein said air lock comprises at least two sliding gate valves.

4. The gasifier as in claim 1, additionally comprising one or more components adapted to treat the combustible gas exiting from said housing, said one or more components selected from the group consisting of a cyclone separator, a heat exchanger, a baghouse filter, a dryer, and a gas scrubber.

5. The gasifier as in claim 1, additionally comprising a controller that monitors operating conditions in said gasifier and automates the processes of said gasifier.

6. The gasifier as in claim 1, additionally comprising a water steam inlet adapted to inject steam into gas in said upper housing chamber.

7. The gasifier as in claim 1, additionally comprising an ash remover adapted to controllably remove ash from said combustion chamber without substantially changing the air pressure in said combustion chamber.

8. The gasifier as in claim 7, wherein said ash remover comprises a variable speed auger and an air lock.

9. The gasifier as in claim 8, wherein said air lock comprises at least two sliding gate valves.

10. The gasifier as in claim 1, additionally comprising a gas flow controller adapted to variably direct gas from said combustion chamber to an external flare.

11. The gasifier as in claim 1, additionally comprising one or more thermocouples to monitor the temperature of said combustion chamber and said one or more catalyst cartridges.

12. The gasifier as in claim 1, wherein said one or more catalyst cartridges contain pellets of a dolomite tar-cracking catalyst.

13. The gasifier as in claim 1, additionally comprising a collector adapted to collect and store the exiting gas from said housing.

14. The gasifier as in claim 1, additionally comprising a mobile unit to transport said gasifier.

15. A method of producing combustible gas from biomass, said method comprising the sequential steps of:

(a) introducing combustible biomass into the combustion chamber of the gasifier of claim 1;

(b) igniting the biomass with introduced air from below the combustion chamber;

(c) reversing the air flow after ignition with introduced air from above the combustion chamber;

(d) combusting biomass in the combustion chamber with stoichiometrically insufficient concentrations of oxygen or air, so that synthesis gas is produced;

(e) heating a tar-cracking catalyst inside the catalyst cartridges using heat from the combustion of biomass in the combustion chamber;

(f) causing the synthesis gas to contact the heated catalyst; and (g) collecting gas that exits the housing.

\* \* \* \* \*